(12) United States Patent
Goldenshtein et al.

(10) Patent No.: US 12,455,254 B2
(45) Date of Patent: Oct. 28, 2025

(54) ELECTRICAL IMPEDANCE MEASUREMENT USING AN ELECTRON BEAM

(71) Applicant: APPLIED MATERIALS ISRAEL LTD., Rehovot (IL)

(72) Inventors: Alex Goldenshtein, Ness Ziona (IL); Dan Tuvia Fuchs, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 563 days.

(21) Appl. No.: 17/984,041

(22) Filed: Nov. 9, 2022

(65) Prior Publication Data

US 2024/0151669 A1   May 9, 2024

(51) Int. Cl.
*G01N 27/02*    (2006.01)

(52) U.S. Cl.
CPC ......... *G01N 27/021* (2013.01); *G01N 27/028* (2013.01)

(58) Field of Classification Search
CPC .. G01N 23/2251; G01N 27/02; G01N 27/021; G01N 27/028; G01R 29/24; G06T 7/0004; G06T 2207/10061; G06T 2207/30148; H01J 37/222; H01J 37/226; H01J 37/228; H01J 37/244; H01J 37/28; H01J 37/00; H01J 37/02; H01J 37/26; H01J 37/22; H01J 2237/0048; H01J 2237/24564; H01J 2237/2817; H01L 22/14
USPC .......................................... 250/306, 307, 311
See application file for complete search history.

(56) References Cited

U.S. PATENT DOCUMENTS 6,515,282 B1 * 2/2003 Veneklasen .......... G01R 31/305
                                                             250/311
2021/0116398 A1 * 4/2021 Ren ....................... H01J 37/026

* cited by examiner

*Primary Examiner* — Jason L McCormack
(74) *Attorney, Agent, or Firm* — Kilpatrick Townsend & Stockton LLP

(57) ABSTRACT

A method for evaluating an impedance related value of a structure of a sample, the method includes: (i) performing a first illumination iteration that includes charging the structure with an illumination iteration charge; (ii) performing a second illumination iteration that includes imaging the structure to provide an image of the structure; a value of the illumination iteration charge and a value of a time difference between step (i) and step (ii) are determined to introduce a dependency between an impedance of the structure and the image of the structure; wherein steps (i) and (ii) are executed using an electron beam, and (iii) determining the impedance related value of the structure based on the image of the structure. There may be three or more values of the impedance related value.

15 Claims, 7 Drawing Sheets

ELECTRICAL IMPEDANCE MEASUREMENT USING AN ELECTRON BEAM

BACKGROUND OF THE INVENTION

Scanning electron microscope voltage contrast tests provide an indication whether a structure of a semiconductor wafer (the structure is three dimensional and of microscopic scale) is shorted to the ground or not.

There is a growing need to provide more information regarding the impedance of the structure.

BRIEF SUMMARY OF THE INVENTION

There may be provided a charged particle system for evaluating an impedance related value of a structure of a sample, the charged particle system may include an imager and an impedance circuit. The imager may be configured to (i) perform a first illumination iteration that comprises charging the structure, using an electron beam, with an illumination iteration charge; wherein the structure is three dimensional and of microscopic scale; and (ii) perform a second illumination iteration that comprises imaging the structure, using the electron beam, to provide an image of the structure; wherein there is a time difference between the first illumination iteration and the second illumination iteration; wherein a value of the illumination iteration charge and a value of the time difference between the first illumination iteration and the second illumination iteration are determined to introduce a dependency between an impedance of the structure and the image of the structure. The impedance circuit may be configured to: determine the impedance related value of the structure based on the image of the structure, wherein the impedance related value of the structure is selected out of three or more different impedance related values There may be provided a method for evaluating an impedance related value of a structure of a sample, the method may include (i) performing, by an imager, a first illumination iteration that comprises charging the structure, using an electron beam, with an illumination iteration charge; wherein the structure is three dimensional and of microscopic scale; (ii) performing, by the imager, a second illumination iteration that comprises imaging the structure, using the electron beam, to provide an image of the structure; wherein there is a time difference between the first illumination iteration and the second illumination iteration; wherein a value of the illumination iteration charge and a value of the time difference between the first illumination iteration and the second illumination iteration are determined to introduce a dependency between an impedance of the structure and the image of the structure; and (iii) determining, by an impedance circuit, the impedance related value of the structure based on the image of the structure, wherein the impedance related value of the structure is selected out of three or more different impedance related values.

There may be provided a non-transitory computer readable medium for evaluating an impedance related value of a structure of a sample, the non-transitory computer readable medium stores instructions that once executed by a charged particle system, cause the charged particle system to (i) perform, by an imager of the charged particle system, a first illumination iteration that comprises charging the structure, using an electron beam, with an illumination iteration charge; wherein the structure is three dimensional and of microscopic scale; (ii) perform, by the imager, a second illumination iteration that comprises imaging the structure, using the electron beam, to provide an image of the structure; wherein there is a time difference between the first illumination iteration and the second illumination iteration; wherein a value of the illumination iteration charge and a value of the time difference between the first illumination iteration and the second illumination iteration are determined to introduce a dependency between an impedance of the structure and the image of the structure; and (iii) determining, by an impedance circuit of the charged particle system, the impedance related value of the structure based on the image of the structure, wherein the impedance related value of the structure is selected out of three or more different impedance related values.

BRIEF DESCRIPTION OF THE DRAWINGS

The subject matter regarded as the invention is particularly pointed out and distinctly claimed in the concluding portion of the specification. The invention, however, both as to organization and method of operation, together with specimen s, features, and advantages thereof, may best be understood by reference to the following detailed description when read with the accompanying drawings in which:

Figure 1:
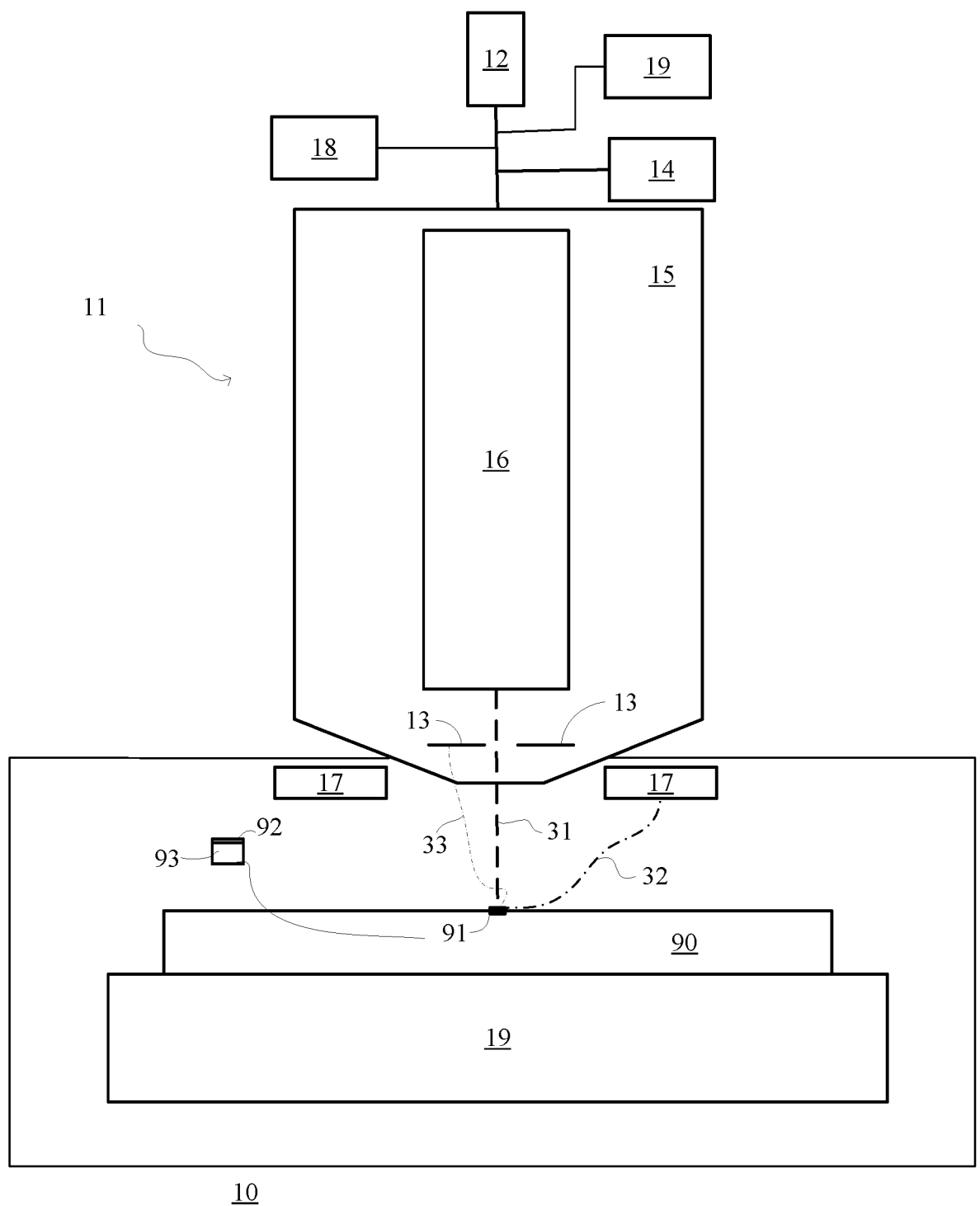
FIG. 1 illustrates an example of a charged particle system and a sample.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure.

Any reference in the specification to a method should be applied mutatis mutandis to a system capable of executing the method and should be applied mutatis mutandis to a computer program product that stores instructions that once executed result in the execution of the method.

Any reference in the specification to a system should be applied mutatis mutandis to a method that may be executed by the system should be applied mutatis mutandis to a computer program product that stores instructions that can be executed by the system.

Any reference in the specification to a computer program product should be applied mutatis mutandis to a method that may be executed when executing instructions stored in the computer program product and should be applied mutandis to a system that is configured to executing instructions stored in the computer program product.

The term and/or means additionally or alternatively. For example A and/or B means only A, or only B or A and B.

There may be provided a charged particle system for evaluating an impedance related value of a structure of a sample.

The impedance related value of the structure of the sample may be the impedance of the structure, a quality of the structure, a functionality of the structure, a time constant of discharging of the structure, or any other value that may provide an indication regarding the impedance of the structure.

The charged particle system may use charged particle beams (one or more electron beams and/or one more ion beams) to evaluate the sample. Examples of charged particle systems may include a scanning electron microscope (SEM), a transmissive electron microscope (TEM), an electron beam inspection system, an ion beam inspection system, and the like. For simplicity of explanation it is assumed that the charged particle system is a SEM that uses a single electron beam.

The charged particle system may include an imager and an impedance circuit. Alternatively, the impedance circuit may be located outside the charged particle system, may not belong to the charged particle system, may be located at another country, another city, may be located within a could computing environment, and the like.

The imager may be configured to: (i) perform a first illumination iteration that includes charging the structure, using an electron beam, with an illumination iteration charge; wherein the structure is three dimensional and of microscopic scale; and (ii) perform a second illumination iteration that includes imaging the structure, using the electron beam, to provide an image of the structure. There is a time difference between the first illumination iteration and the second illumination iteration.

The value of the illumination iteration charge and the value of the time difference between the first illumination iteration and the second illumination iteration may be determined to introduce a dependency between an impedance of the structure and the image of the structure. The dependency causes the image of the structure to provide an indication regarding the impedance related value of the structure. The determining of any of the values may include modeling the structure and/or simulating the charging and/or discharging of the structure, using an resistor capacitor representation of the structure, and the like.

The value of the illumination iteration charge and the value of the time difference may be determined to associate a charging state of the structure with the impedance of the structure. A charging state may be the amount of charge stored in the structure.

The value of the illumination iteration charge and the value of the time difference may be determined to: (i) fully discharge the illumination iteration charge when the impedance of the structure has a first value, and (ii) to partially discharge the illumination iteration charge when the impedance of the structure has a second value that differs from the first value.

The time difference between illumination iterations may change from time to time—for example a time difference between a first pair of the multiple illumination iterations may differ from a time different between a second pair of the multiple illumination iterations.

The value of an illumination iteration charge may change over time, for example, a value of an illumination iteration charge of one of the multiple illumination iterations may differ from a value of the illumination iteration charge of another one of the multiple illumination iterations.

The charged particle system may be configured to determine (for example by using a processor of the charged particle system) the value of the illumination iteration charge and to determine the value of the time difference between the first illumination iteration and the second illumination iteration. Alternatively, the charged particle system may be configured to receive the value of the of the illumination iteration charge, and to determine the value of the time difference between the first illumination iteration and the second illumination iteration.

The imager may be configured to execute more than two illumination iterations. An illumination iteration may include both charging and image generating.

The impedance circuit may be configured to determine the impedance related value of the structure based on the image of the structure. The impedance related value of the structure is selected out of three or more different impedance related values, thus it is not merely limited to be "short" of "isolated". The impedance circuit may include one or more processing circuits. A processing circuit may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

The impedance circuit may be configured to determine the impedance related value of the structure based on intensities of structure pixels in the image of the structure. A structure pixel "falls on" the structure. For example, the impedance circuit may configured to determine the impedance related value of the structure based on an average of intensities of structure pixels in the image of the structure or a weighted sum of the intensities of structure pixels, and the like.

The imager may be configured to perform multiple (for example three or more) illumination iterations, and to generate an image of the sample during, at least, a last illumination iteration of the multiple illumination iterations. The imager may be configured to generate at least two images of the sample during at least two of the multiple illumination iterations.

Assuming that two or more images are acquired—the impedance circuit may be configured to determine the impedance related value of the structure based on a relationship between the at least two images.

For example, the impedance circuit may configured to determine that the structure is functional when the at least two images are substantially equal to each other.

Yet for another example, the impedance circuit is configured to determine that the structure is faulty when an average of structure pixels intensities within the at least two images significantly (for example by at least 3, 6, 9, 12 percent) increases over time.

FIG. 1 illustrates an example of a charged particle system 10 and a sample 90. The sample 90 includes a structure 91 that is illuminated by electron beam 31. The structure is three dimensional and of a microscopic scale. Microscopic scale means that one or more dimensions of the structure (for example height, width, length) may range between less than a nanometer and one hundred microns.

The charged particle system 10 includes an imager 11 and an impedance circuit 18.

In FIG. 1 the imager 11 includes memory unit 14, processor 12 (including one or more processing circuits), controller 18, column 15, sensors such as in-column sensor 12 and out-of-column sensor 17, mechanical stage 19 for moving the sample 90, and the like.

Electron optics 16 are illustrated as being included in the column 15 while at least part of the electron optics may be located outside the column. The electron optics 16 may include an electron beam source and any optical elements (for example lenses, beam shapers, deflectors, and the like) for providing electron beam 31 and/or for collecting electrons (such as scattered electrons 33 and/or scattered electrons 32) that are scattered from the sample. The electron optics may include illumination optics and collection optics.

The charged particle system may include any number of sensors of any type of sensors. For example, secondary electron sensors, backscattered electron sensors, x-ray sensors, and the like.

The processor 12 may be configured to perform image generation, image processing and the like.

Memory unit 14 may store images, instructions to be executed by the processor 12, and the like.

Controller 13 may control any aspect of operation of the charged particle system 10.

Figure 2:
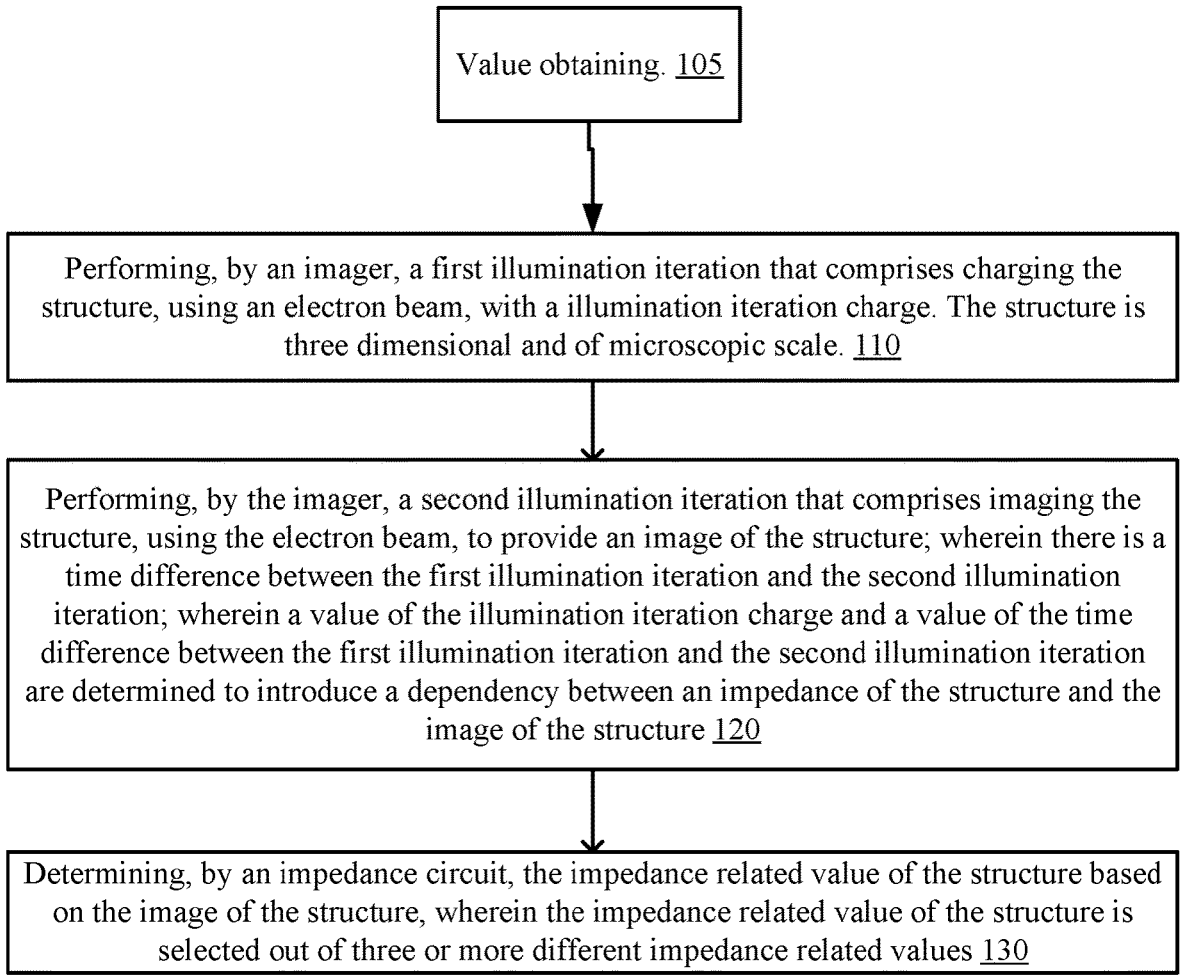
FIG. 2 illustrates an example of a method according to some embodiments.

FIG. 2 illustrates a method 100 for evaluating an impedance related value of a structure of a sample.

Method 100 may start by step 105 of value obtaining. This may include receiving or determining the value of the illumination iteration charge and/or receiving or determining the value of the time difference between the first illumination iteration and the second illumination iteration.

Step 105 may be followed by step 110 of performing, by an imager, a first illumination iteration that includes charging the structure, using an electron beam, with an illumination iteration charge. The structure is three dimensional and of microscopic scale. The illumination iteration charge is the amount of charged that is added to the structure during the charging.

Step 110 may be followed by step 120 of performing, by the imager, a second illumination iteration that includes imaging the structure, using the electron beam, to provide an image of the structure. The is a time difference between the first illumination iteration and the second illumination iteration. A value of the illumination iteration charge and a value of the time difference between the first illumination iteration and the second illumination iteration are determined to introduce a dependency between an impedance of the structure and the image of the structure.

Step 120 may be followed by step 130 of determining, by an impedance circuit, the impedance related value of the structure based on the image of the structure. The impedance related value of the structure is selected out of three or more different impedance related values.

The value of the illumination iteration charge and the value of the time difference between the first illumination iteration and the second illumination iteration may be determined to introduce a dependency between an impedance of the structure and the image of the structure. The dependency causes the image of the structure to provide an indication regarding the impedance related value of the structure.

The value of the illumination iteration charge and the value of the time difference may be determined to associate a charging state of the structure with the impedance of the structure.

The value of the illumination iteration charge and the value of the time difference may be determined to (i) fully discharge the illumination iteration charge when the impedance of the structure has a first value, and (ii) to partially discharge the illumination iteration charge when the impedance of the structure has a second value that differs from the first value. The fully discharge of (i) and the partially discharge of (ii) may be a point of time just before starting the second illumination iteration.

Step 110, step 120 and/or step 130 may be executed multiple times. It should be noted that an illumination iteration may include both charging and image generating. For example—the acquisition of an image of the structure also involves charging the structure.

The duration of different illumination iterations may be the same or may differ between at least some of the different illumination iterations.

A charging of the structure during of different illumination iterations may be the same—or may differ between at least some of the different illumination iterations.

Step 130 may include determining the impedance related value of the structure based on the image of the structure, wherein the impedance related value of the structure is selected out of three or more different impedance related values.

Step 130 may include determining the impedance related value of the structure based on intensities of structure pixels in the image of the structure. For example—determining the impedance related value of the structure based on an average of intensities of structure pixels in the image of the structure.

Assuming that more than two illumination iterations are executed then the time difference between illumination iterations may change from time to time. For example, a time difference between a first pair of the multiple illumination iterations may differ from a time different between a second pair of the multiple illumination iterations.

Assuming that more than two illumination iterations are executed then the value of an illumination iteration charge may change over time. For example, a value of an illumination iteration charge of one of the multiple illumination iterations may differ from a value of the illumination iteration charge of another one of the multiple illumination iterations.

Method 100 may include performing any number of step 110, wherein one or more repetitions of step 110 may be followed by executing step 120. Step 130 may follow one or more repetitions of steps 110-120.

Accordingly—assuming multiple repetitions of step 110, step 120 may be executed one or more to provide one or more images of the sample at one or more points in time. For example—an image may be generated, at least, at a last repetition of step 120. Yet for another example—at least two images may be executed during at least two repetitions of step 120.

Assuming that two or more images are acquired step 130 may include determining the impedance related value of the structure based on a relationship between the at least two images.

For example, step 130 may include determining that the structure is functional when the at least two images are substantially equal to each other. Substantially equal—below a predefined difference value—for example change in average gray level of structure pixels by up to 3, 6, 9, 12 percent.

Yet for another example step 130 may include determining that the structure is faulty when an average of structure pixels intensities within the at least two images significantly increases over time.

Substantially—below a predefined different value—for example change in average gray level of structure pixels by up to 3, 6, 9, 12 percent.

Significantly—above a predefined intensity value—for example above a substantial change.

Figure 3:
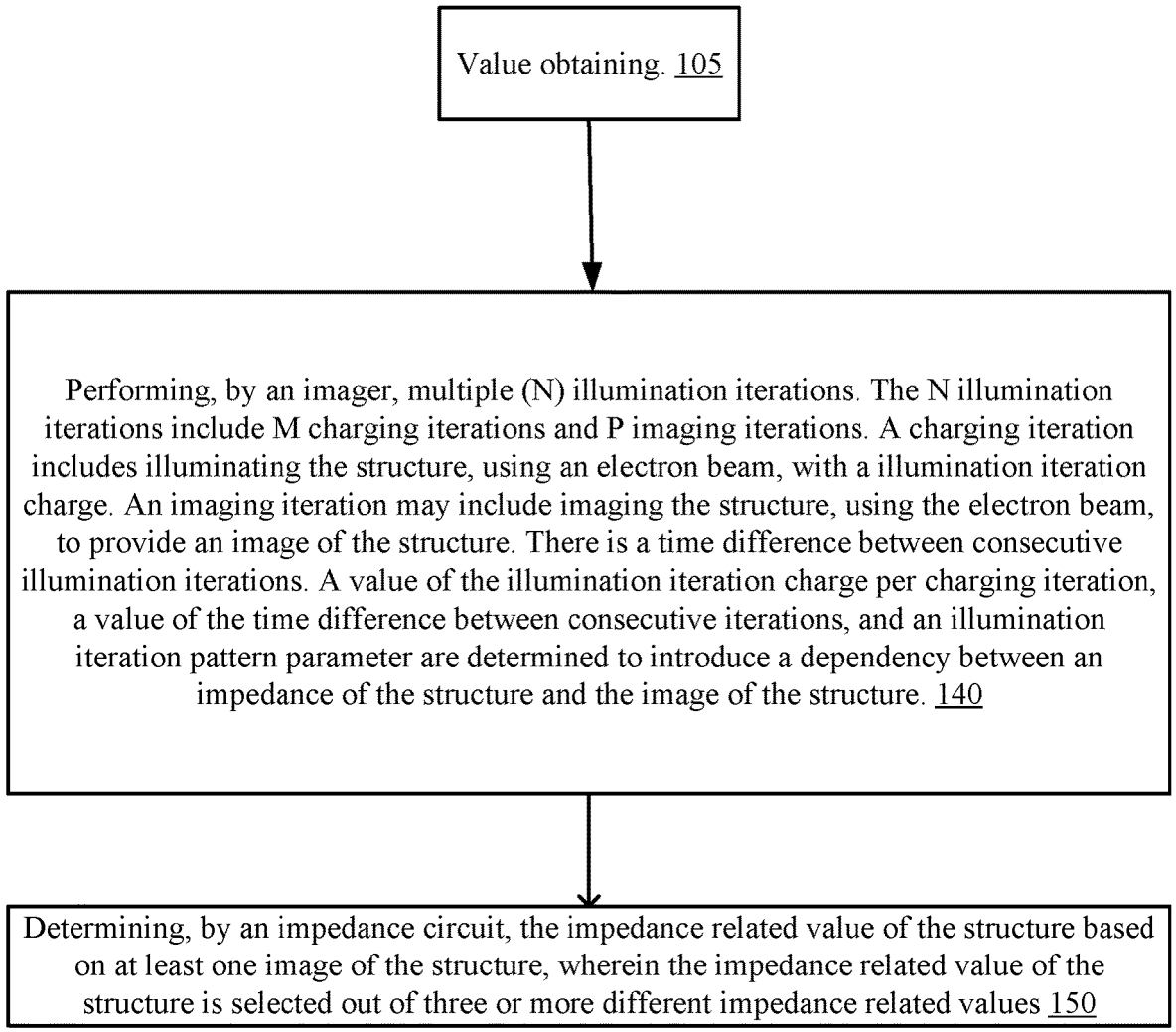
FIG. 3 illustrates an example of a method according to some embodiments.

FIG. 3 illustrates an example of method 101.

Method 101 may start by step 105 of value obtaining. This may include receiving or determining the value of the illumination iteration charge and/or receiving or determining the value of the time difference between the first illumination iteration and the second illumination iteration.

Step 105 may be followed by step 140 of performing, by an imager, multiple (N) illumination iterations. The N illumination iterations include M charging iterations and P imaging iterations. A charging iteration includes illuminating the structure, using an electron beam, with an illumination iteration charge. An imaging iteration may include imaging the structure, using the electron beam, to provide an image of the structure.

N may equal M, may equal P, may exceed M or may exceed P. N is a positive integer that may equal two or may exceed two. P is a positive integer that may be one or may exceed one. M is a positive integer that may be one or may exceed one.

A single illumination iteration may be an illumination iteration and an imaging iteration.

A value of the illumination iteration charge per charging iteration, a value of the time difference between consecutive iterations, and an illumination iteration pattern parameter are determined to introduce a dependency between an impedance of the structure and the image of the structure.

The illumination pattern parameter may be a number of illumination iterations per imaging iteration. If, for example, and in order to overcome noise and/or increase the robustness of the determination of step 130—there is a need to perform K charging iterations followed by an imaging iteration—then K is the illumination pattern parameter.

Step 140 may include one or more repetitions of step 110 of method 100 and/or one or more repetitions of step 120 of method 100.

Step 140 may be followed by step 150 of determining, by an impedance circuit, the impedance related value of the structure based on at least one image of the structure, wherein the impedance related value of the structure is selected out of three or more different impedance related values.

Figure 4:
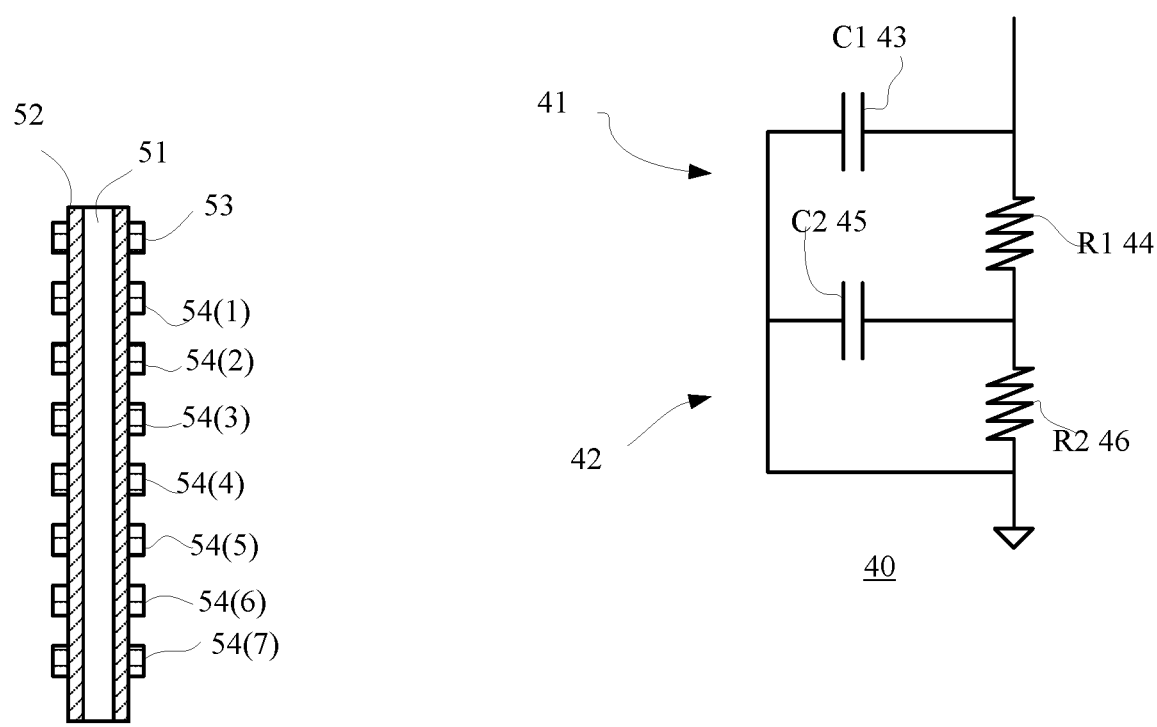
FIG. 4 illustrates an example of a structure and a model according to some embodiments.
Figure 4:
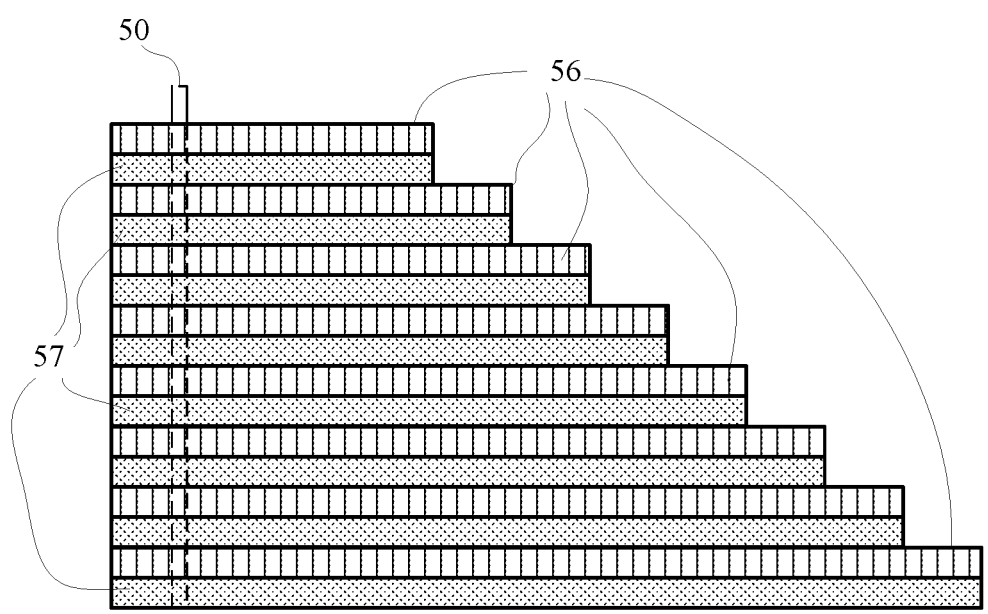

FIG. 4 is an example of a structure 50, of a portion 55 of a three dimensional (3D) NAND memory unit, and of a model 40 of the structure.

Portion 55 of the 3D NAND memory includes multiple alternating layers 56 and 57 through which structures such as bit line 50 are formed.

The structure 50 is a bit line of the 3D NAND memory unit and include an interior 51 surrounded by a body 52 and a column of multiple transistor elements (such as gates of transistors)—including the upmost transistor element 53 and the lower transistor elements 54(1)-54(7).

The structure can be modeled as two resistor capacitor (RC) circuits: first RC circuit 41 and second RC circuit 41. First RC circuit 41 includes first resistor R1 44 and first capacitor 43, second RC circuit 42 includes second resistor R2 46 and second capacitor 45.

The first RC circuit 41 represents the surface and near surface parts of the structure 50, for example, the upmost transistor element 53 and its surroundings.

The second RC circuit 42 represents the deeper part of the structure 50, for example, the lower transistor elements 54(1)
54(7) and theirs surroundings.

The first RC circuit 41 exhibits a higher discharge rate, and even after the first RC circuit is fully discharged, the second RC circuit continues to discharge.

Figure 5:
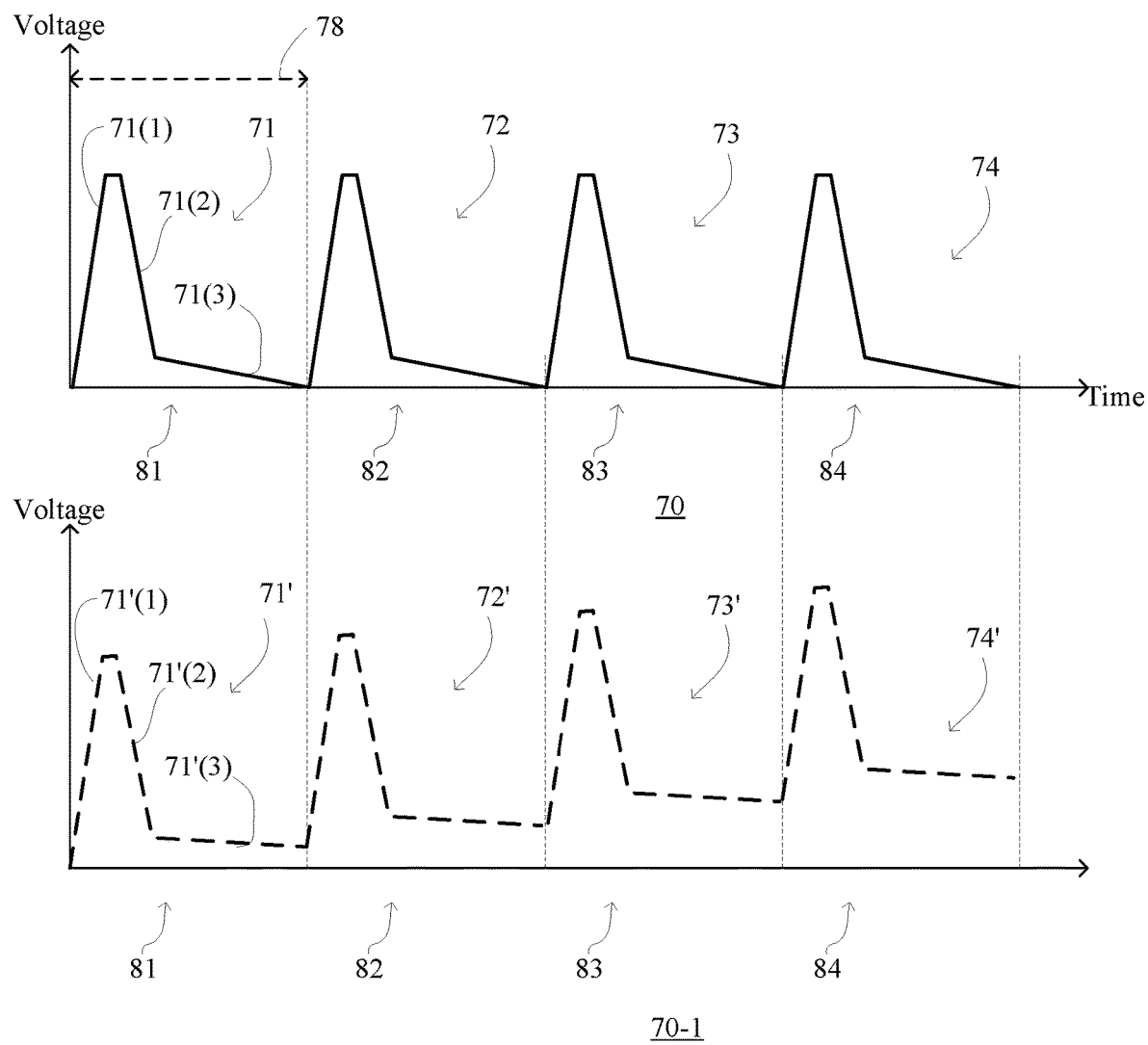
FIG. 5 illustrates examples of timing diagrams according to some embodiments.

FIG. 5 include a desirable timing diagram 70 and a faulty timing diagram 70-1. The desirable timing diagram 70 illustrates the charging and discharging of a structure 50 that is good—has an acceptable or desirable impedance.

The faulty timing diagram 70-1 illustrates the charging and discharging of a structure 50 that is faulty—has an impedance that is not good—undesired or unacceptable impedance.

The values of impedance that are deemed to be desired or undesired (good or faulty) may be determined in any manner, for example, by the manufacturer of the structure, by a client of the manufacturer of the structure, and the like.

The impedance of the structure may have many values—at least more than two value—for example at least one or more values that differ from electrical short or fully isolated.

Each one of desirable timing diagram 70 and faulty timing diagram 70-1 illustrates four illumination iterations 81, 82, 83 and 84 that are evenly spaced from each other (see, for example time difference 78 of timing diagram 70), and involve charging the structure by the same illumination iteration charge.

The timing difference between consecutive illumination iterations and the value of the illumination iteration charge cause a good structure to fully discharge the illumination iteration charge just before the beginning of the next illumination iteration, which results in four charging and discharging graphs (first charging and discharging graph 71, second charging and discharging graph 72, third charging and discharging graph 73 and fourth charging and discharging graph 74) that are equal to each other.

The timing difference between consecutive illumination iterations and the value of the illumination iteration charge cause a faulty structure to only partially discharge the illumination iteration charge just before the beginning of the next illumination iteration—which results in an aggregation of charge—and introduces difference between the four other charging and discharging graphs (first other charging and discharging graph 71', second other charging and discharging graph 72', third other charging and discharging graph 73', and fourth other charging and discharging graph 74') that are equal to each other.

The charging and discharging graphs of FIG. 1 illustrate a charging (71(1) or 71'(1)), following by a first discharging (71(2), 71'(2)) in which the first RC circuit is dominant—and a second discharging (71(3), 71'(3)) in which the second RC circuit is dominant.

It should be noted that any of the methods mentioned above and/or any of the charged particle system mentioned in the application may operate with other charging and/or discharging patterns—for example with discharging patterns that include more than two distinctive discharging periods, and/or a discharging pattern that is governed by a single time constant.

Figure 6:
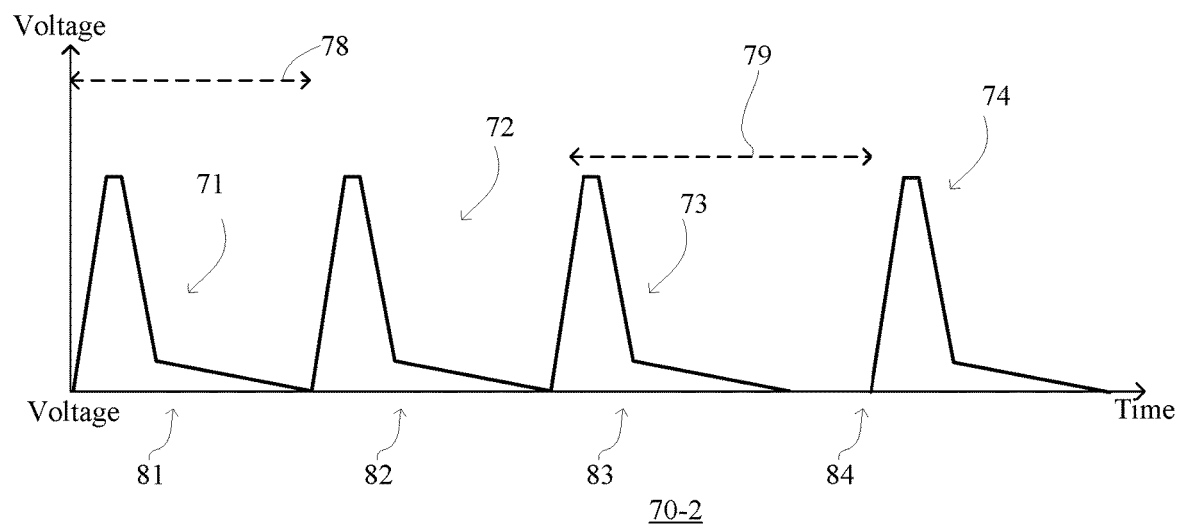
FIG. 6 illustrates examples of timing diagrams according to some embodiments.
Figure 6:
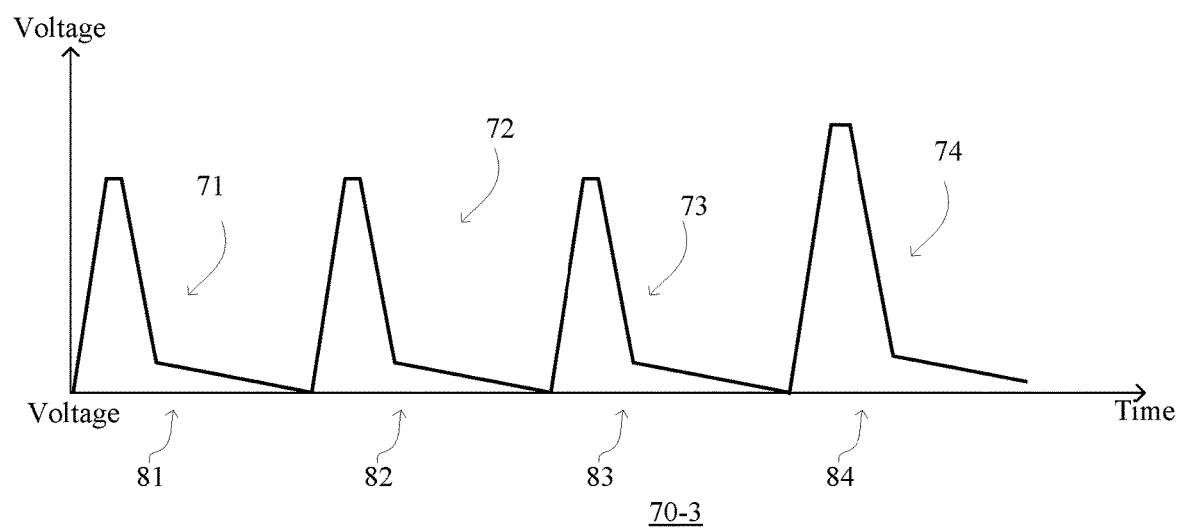

FIG. 6 includes a first desirable timing diagram 70-2 of uneven spacing between two pairs of illumination iterations. The timing difference 78 between a first illumination iteration 81 and a second illumination iteration 82 differs from the timing difference 79 between the third illumination iteration 83 and a fourth illumination iteration 84.

FIG. 6 includes a second desirable timing diagram 70-3 of uneven illumination iteration charge. The illumination iteration charge of the fourth illumination iteration 84, exceeds the illumination iteration charge of any one of the previous illumination iterations.

It should be noted that the sample—especially the structure and/or a surrounding of the structure may be discharged using light radiation that once impinges on the structure and/or the surrounding of the structure results in an emission of electrons. The light may be directed onto an electrode of the charged particle system to emit electrons towards the sample. An example of illumination is provided in U.S. Pat. No. 9,673,023 of Applied Materials Ltd., which is incorporated herein by reference.

Figure 7:
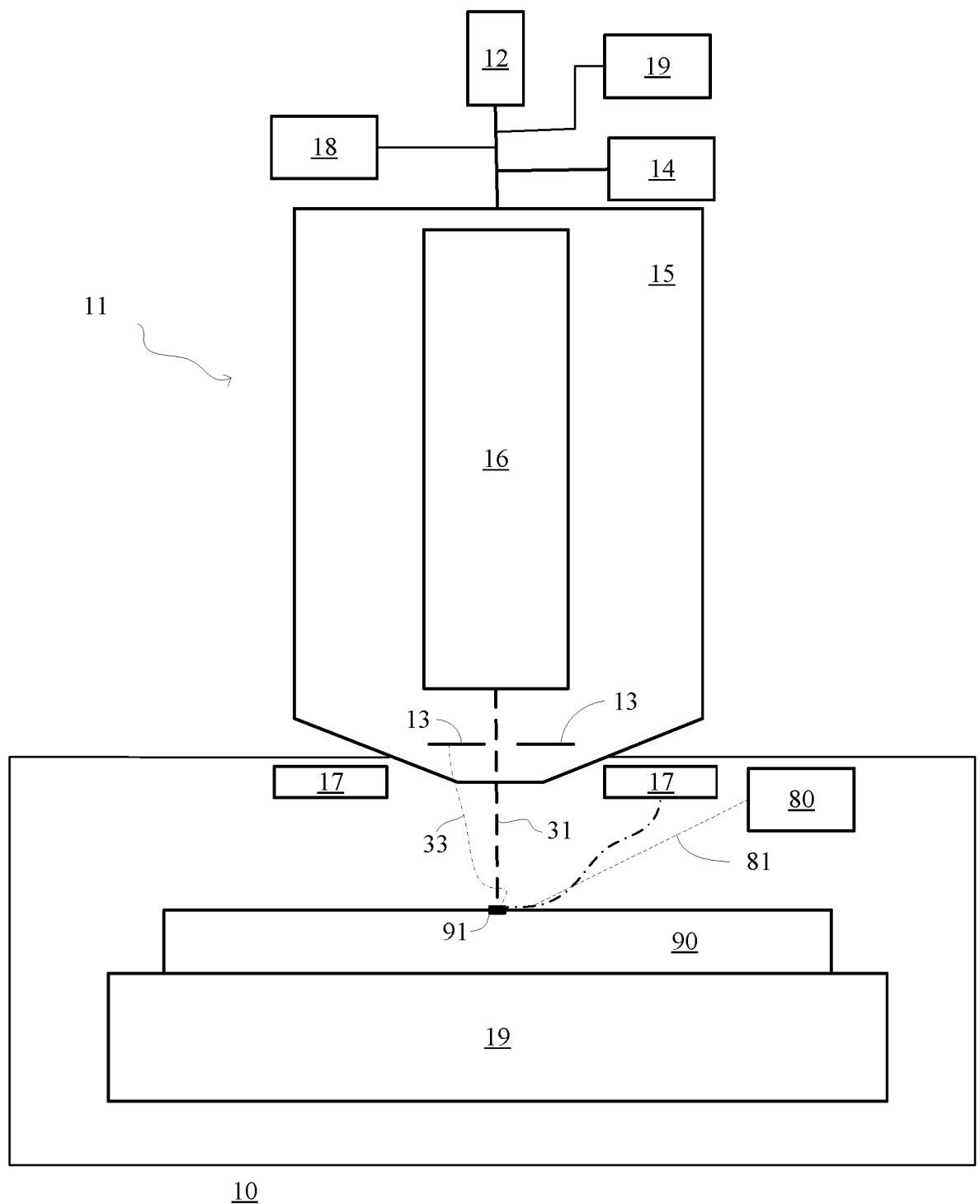
FIG. 7 illustrates an example of a charged particle system and a sample according to some embodiments.

FIG. 7 illustrates an example of a charged particle system 10-1 and a sample 90. The sample 90 includes a structure 91 that is illuminated by electron beam 31.

The charged particle system 10 includes a light source 80 in addition to imager 11 and impedance circuit 18. In FIG. 7 the imager 11 includes memory unit 14, processor 12 (including one or more processing circuits), controller 18, column 15, sensors such as in-column sensor 12 and out-of-column sensor 17, mechanical stage 19 for moving the sample 90, and the like. Electron optics 16 are illustrated as being included in the column 15 while at least part of the electron optics may be located outside the column. The electron optics 16 may include an electron beam source and any optical elements (for example lenses, beam shapers, deflectors, and the like) for providing electron beam 31 and/or for collecting electrons (such as scattered electrons 33 and/or scattered electrons 32) that are scattered from the sample. The electron optics may include illumination optics and collection optics.

The mechanical stage 19 may be a continuously moving mechanical stage or a step by step moving mechanical stage.

The light source 80 is illustrated as illuminating with light beam 81 the sample 90.

The light beam 81 may be used to discharge of different structures such as N-FET transistors gates, P-FET transistor gates, and the like.

Any reference to a structure may be applied mutatis mutandis to multiple structures. For example—multiple structures may be subjected to an illumination iteration—one after the other and/or in parallel to each other.

In one scan pattern a first illumination iteration is implemented by scanning (following a scan direction) of multiple structures, and then back scanning the multiple structures at the opposite direction—for example while defocusing the electron beam—or blanking the electron beam or otherwise preventing the electron beam from charging the multiple structures again. If the scanning occurs while the state moves—then the charged particle system has to compensate for this movement when illuminating the same multiple structures again.

There may be provided an impedance circuit that may be configured to receive one or more images generated by executing steps 110 and 120 of method 100 and to execute step 130 of method 100.

There may be provided an impedance circuit that may be configured to receive images generated by executing step 140 of method 101 and to execute step 150 of method 101.

There may be provided a method that may include (i) receiving one or more images that were generated by executing steps 110 and 120 of method 100, and (ii) executing step 130 of method 100.

There may be provided a method that may include (i) receiving images that were generated by executing steps 140 of method 101, and (ii) executing step 150 of method 101.

There may be provided a non-transitory computer readable medium for evaluating an impedance related value of a structure of a sample, the non-transitory computer readable medium stores instructions that once executed by an impedance circuit, cause the impedance circuit to (i) receive one or more images that were generated by executing steps 110 and 120 of method 100, and (ii) execute step 130 of method 100.

There may be provided a non-transitory computer readable medium for evaluating an impedance related value of a structure of a sample, the non-transitory computer readable medium stores instructions that once executed by an impedance circuit, cause the impedance circuit to (i) receive images that were generated by executing steps 140 of method 101, and (ii) execute step 150 of method 101.

In the foregoing specification, the embodiments of the disclosure have been described with reference to specific examples of embodiments. It will, however, be evident that various modifications and changes may be made therein without departing from the broader spirit and scope of the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any reference to the term "comprising" or "having" or "including" should be applied mutatis mutandis to "consisting" and/or should be applied mutatis mutandis to "consisting essentially of".

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also, for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A charged particle system for evaluating an impedance related value of a structure of a sample, the charged particle system comprising:
    an imager; and
    an impedance circuit;
    wherein the imager is configured to:
    perform a first illumination iteration that comprises charging the structure, using an electron beam, with an illumination iteration charge; wherein the structure is three dimensional and of microscopic scale; and
    perform a second illumination iteration that comprises imaging the structure, using the electron beam, to provide an image of the structure; wherein there is a time difference between the first illumination iteration and the second illumination iteration; wherein a value of the illumination iteration charge and a value of the time difference between the first illumination iteration and the second illumination iteration are determined to introduce a dependency between an impedance of the structure and the image of the structure; and
    wherein the impedance circuit is configured to:
    determine the impedance related value of the structure based on the image of the structure, wherein the impedance related value of the structure is selected out of three or more different impedance related values.

2. The charged particle system according to claim 1 wherein the value of the illumination iteration charge and the value of the time difference are determined to associate a charging state of the structure with the impedance of the structure.

3. The charged particle system according to claim 1 wherein the value of the illumination iteration charge and the value of the time difference are determined to (i) fully discharge the illumination iteration charge when the impedance of the structure has a first value, and (ii) to partially discharge the illumination iteration charge when the impedance of the structure has a second value that differs from the first value.

4. The charged particle system according to claim 1 wherein the impedance circuit is configured to determine the impedance related value of the structure based on intensities of structure pixels in the image of the structure.

5. The charged particle system according to claim 1 wherein the impedance circuit is configured to determine the impedance related value of the structure based on an average of intensities of structure pixels in the image of the structure.

6. The charged particle system according to claim 1 wherein the imager is configured to perform multiple illumination iterations, and to generate the image of the sample during, at least, a last illumination iteration of the multiple illumination iterations.

7. The charged particle system according to claim 6 wherein the imager is configured to generate at least two images of the sample during at least two of the multiple illumination iterations.

8. The charged particle system according to claim 7 wherein the impedance circuit is configured to determine the impedance related value of the structure based on a relationship between the at least two images.

9. The charged particle system according to claim 8 wherein the impedance circuit is configured to determine that the structure is functional when the at least two images are substantially equal to each other.

10. The charged particle system according to claim 8 wherein the impedance circuit is configured to determine that the structure is faulty when an average of structure pixels intensities within the at least two images significantly increases over time.

11. The charged particle system according to claim 6 wherein a time difference between a first pair of the multiple illumination iterations differs from a time different between a second pair of the multiple illumination iterations.

12. The charged particle system according to claim 6 wherein a value of an illumination iteration charge of one of the multiple illumination iterations differs from a value of the illumination iteration charge of another one of the multiple illumination iterations.

13. The charged particle system according to claim 1 wherein the charged particle system is configured to determine the value of the illumination iteration charge and to determine the value of the time difference between the first illumination iteration and the second illumination iteration.

14. A method for evaluating an impedance related value of a structure of a sample, the method comprising:
performing, by an imager, a first illumination iteration that comprises charging the structure, using an electron beam, with an illumination iteration charge; wherein the structure is three dimensional and of microscopic scale;
performing, by the imager, a second illumination iteration that comprises imaging the structure, using the electron beam, to provide an image of the structure; wherein there is a time difference between the first illumination iteration and the second illumination iteration; wherein a value of the illumination iteration charge and a value of the time difference between the first illumination iteration and the second illumination iteration are determined to introduce a dependency between an impedance of the structure and the image of the structure; and
determining, by an impedance circuit, the impedance related value of the structure based on the image of the structure, wherein the impedance related value of the structure is selected out of three or more different impedance related values.

15. A non-transitory computer readable medium for evaluating an impedance related value of a structure of a sample, the non-transitory computer readable medium stores instructions that once executed by a charged particle system, cause the charged particle system to:
perform, by an imager of the charged particle system, a first illumination iteration that comprises charging the structure, using an electron beam, with an illumination iteration charge; wherein the structure is three dimensional and of microscopic scale;
perform, by the imager, a second illumination iteration that comprises imaging the structure, using the electron beam, to provide an image of the structure; wherein there is a time difference between the first illumination iteration and the second illumination iteration; wherein a value of the illumination iteration charge and a value of the time difference between the first illumination iteration and the second illumination iteration are determined to introduce a dependency between an impedance of the structure and the image of the structure; and
determining, by an impedance circuit of the charged particle system, the impedance related value of the structure based on the image of the structure, wherein the impedance related value of the structure is selected out of three or more different impedance related values.

* * * * *